United States Patent
Moriya et al.

(10) Patent No.: US 7,445,840 B2
(45) Date of Patent: Nov. 4, 2008

(54) WEATHER-RESISTANT SYNTHETIC WOOD MATERIAL

(75) Inventors: Mamoru Moriya, Tokyo (JP); Shuji Nishizaki, Tokyo (JP)

(73) Assignee: Seiki Kogyo Co., Ltd., Tokyo (JP)

(*) Notice: Subject to any disclaimer, the term of this patent is extended or adjusted under 35 U.S.C. 154(b) by 0 days.

(21) Appl. No.: 10/584,765

(22) PCT Filed: Dec. 24, 2004

(86) PCT No.: PCT/JP2004/019369

§ 371 (c)(1),
(2), (4) Date: Jun. 28, 2006

(87) PCT Pub. No.: WO2005/063479

PCT Pub. Date: Jul. 14, 2005

(65) Prior Publication Data

US 2007/0128428 A1    Jun. 7, 2007

(30) Foreign Application Priority Data

Dec. 29, 2003 (JP) .................. 2003-436890
Mar. 22, 2004 (JP) .................. 2004-083526
Mar. 22, 2004 (JP) .................. 2004-083527

(51) Int. Cl.
   *B32B 27/06* (2006.01)
(52) U.S. Cl. .............. 428/319.3; 428/319.7; 428/316.6; 428/317.9; 428/74; 428/76
(58) Field of Classification Search .............. 428/317.9, 428/319.3, 319.7, 316.6, 74, 76
See application file for complete search history.

(56) References Cited

U.S. PATENT DOCUMENTS

| 3,810,337 | A | * | 5/1974 | Pollard | ............... | 52/223.8 |
| 6,139,945 | A | * | 10/2000 | Krejchi et al. | ............ | 428/317.9 |
| 6,752,941 | B2 | * | 6/2004 | Hills | ............... | 264/75 |
| 6,863,972 | B2 | * | 3/2005 | Burger et al. | ............ | 428/319.3 |
| 6,958,185 | B1 | * | 10/2005 | Zehner | ............... | 428/317.9 |
| 2005/0154094 | A1 | * | 7/2005 | Maeda et al. | ............ | 524/35 |

FOREIGN PATENT DOCUMENTS

JP    4-191043    7/1992

(Continued)

OTHER PUBLICATIONS

Translation of JP 2003-184289, Tsurura et al, "Floorboard", Jul. 3, 2003.*
Translation of JP 2002-347152, Hiromitsu Vabe, "Building Material Made of Foamed Synthetic Resin", Dec. 4, 2002.*
Sawada, Keiji, "Plastic Oshidashi Keisei no Saishin Gijutsu", 1st edition, Kabushiki Kaisha Raba Daijesuto Sha, pp. 239-244, Jun. 25, 1993.

*Primary Examiner*—Hai Vo
(74) *Attorney, Agent, or Firm*—Oblon, Spivak, McClelland, Maier & Neustadt, P.C.

(57) ABSTRACT

The present invention provides a synthetic wood including a body containing a polystyrene- or polypropylene-based resin as the major component and a weather-resistant outer layer with excellent adhesion to the body. A synthetic wood 1A includes a body 2 defining a core thereof and formed of a polystyrene or polypropylene foam and an outer layer 3 covering the body and formed of a weather-resistant synthetic resin that is unfoamed or foamed at a low expansion rate. The body and the outer layer are integrally bonded by coextrusion. The body contains a polystyrene- or polypropylene-based resin as the major component. The outer layer contains an acrylonitrile-acrylic rubber-styrene copolymer and/or an acrylonitrile-ethylene propylene rubber-styrene copolymer, which are weather-resistant resins, as the major component. The outer layer further contains the major component resin of the body as a minor component in such an amount that the minor component contributes to the enhancement of the adhesion between the body and the outer layer without impairing weather resistance.

26 Claims, 1 Drawing Sheet

FOREIGN PATENT DOCUMENTS

| JP | 9-228577 | 9/1997 |
| JP | 2001-30430 | 2/2001 |
| JP | 2001-205751 | 7/2001 |
| JP | 2003-321563 | 11/2003 |

* cited by examiner

WEATHER-RESISTANT SYNTHETIC WOOD MATERIAL

TECHNICAL FIELD

The present invention relates to synthetic woods covered with an outer layer, and specifically relates to a weather-resistant synthetic wood that can be used outdoors with enhanced adhesion between an outer layer and a body.

BACKGROUND Art

Synthetic woods formed of a resin foam covered with a dense outer layer have been widely used for indoor applications, including wet areas, furniture, and interior finishes, for their advantages such as dimensional stability, uniform mechanical strength, uniform surface conditions, and durability. In contrast to natural wood, the synthetic woods exhibit no water absorbency and have uniform material quality and resistance to rot due to rot fungi, contamination due to mold, and damage due to infestation of insects such as termites.

The synthetic woods are designed to have similar density and machinability in nailing and sawing, for example, to those of natural wood because synthetic woods that can be handled in the same manner as natural wood are desired. On the other hand, the synthetic woods are designed to have low weight, excellent machinability, and high surface strength. Such synthetic woods are produced by covering a body formed of a resin foam with a skin layer or by bonding a highly adhesive outer layer formed of an unfoamed resin or a low-expansion resin foam to a body formed of a resin foam to prevent damage due to external forces.

Recycling of materials has been actively promoted with increasing need for reduction of waste in the plastics industry. Use of waste resin as a source material for synthetic wood has been attempted because enormous amounts of waste resin have been produced, particularly polystyrene (hereinafter referred to as PS) and polypropylene (hereinafter referred to as PP), which have been manufactured in large amounts.

PS and PP, however, are difficult to use outdoors because of their poor weather resistance and thus have limited applications. The problem of poor weather resistance remains even if high-impact polystyrene (hereinafter referred to as HI-PS) is optionally added to PS.

To enable the use of such resins outdoors, studies have been conducted on a weather-resistant synthetic wood including a body formed of PS or PP and covered with an outer layer formed of a weather-resistant resin such as an acrylonitrile-acrylic rubber-styrene copolymer (hereinafter referred to as AAS) and an acrylonitrile-ethylene propylene rubber-styrene copolymer (hereinafter referred to as AES). Unfortunately, these resins have poor adhesion to a foam of PS or a mixture of PS and HI-PS and are thus easily peeled from the foam at the contact surface therebetween.

DISCLOSURE OF INVENTION

Problems to be Solved by the Invention

A technical object of the present invention, which has been made to solve the problems described above, is to provide a synthetic wood including a body formed of PS or PP and a weather-resistant outer layer with excellent adhesion therebetween.

Another object of the present invention is to provide a synthetic wood having similar appearance and texture (woodiness) to those of natural wood.

Means for Solving the Problem

To achieve the above objects, the present invention provides a weather-resistant synthetic wood basically including a body defining a core thereof and formed of a synthetic resin foam and an outer layer covering the body and formed of a synthetic resin that is unfoamed or foamed at a lower expansion rate than the resin foam for the body. The body and the outer layer are integrally bonded by coextrusion. The body contains a PS- or PP-based resin as the major component. The synthetic resin for the outer layer contains a weather-resistant synthetic resin as the major component and contains the major component resin of the body as a minor component in such an amount that the minor component contributes to the enhancement of the adhesion between the body and the outer layer without impairing weather resistance.

In a preferred embodiment of the present invention in which the PS-based resin is used for the body of the synthetic wood, the body contains PS or a mixture of 100 parts by weight of PS and 0 to 400 parts by weight of HI-PS as the major component, and the outer layer, which contains the major component of the body as the minor component, contains AAS and/or AES as the major component.

The content of the minor component in the outer layer is preferably 5 to 80 parts by weight, more preferably 25 to 40 parts by weight, based on 100 parts by weight of the major component.

In another preferred embodiment of the present invention, the body further contains at least one of ABS, AAS, and AES as a minor component in an amount of 5 to 50 parts by weight, more preferably 10 to 25 parts by weight, based on 100 parts by weight of the major component.

The outer layer preferably has a foaming magnification of 1.1 to 1.2 times, contains wood flour as a minor component in an amount of 15 to 30 parts by weight based on 100 parts by weight of the material for the outer layer, and contains a wood color pigment to present woodiness.

In a preferred embodiment of the present invention in which the PP-based resin is used for the body of the synthetic wood, on the other hand, the body contains PP as the major component and optionally contains an adhesion enhancer as a minor component, and the outer layer, which contains the major component of the body, namely PP, as the minor component, contains AAS and/or AES as the major component.

In the preferred embodiment of the present invention, the body contains at least one of ABS, AAS, and AES as the minor component in an amount of 5 to 50 parts by weight based on 100 parts by weight of the major component, namely PP, and further contains wood flour in an amount of 5 to 400 parts by weight, more preferably 80 to 200 parts by weight, based on 100 parts by weight of the major component, namely PP.

The content of the minor component, namely PP, in the outer layer is 3 to 10 parts by weight, more preferably 5 to 7 parts by weight, based on 100 parts by weight of the major component.

The outer layer preferably has a foaming magnification of 1.1 to 1.2 times, contains wood flour as a minor component in an amount of 5 to 30 parts by weight based on 100 parts by weight of the material for the outer layer, and contains a wood color pigment to present woodiness.

In the embodiments described above, the body is preferably a solid-core foam having a foaming magnification of 1.2 to 3.0 times and formed in a predetermined elongated cross-sectional shape. In this case, fiberglass wires containing fiberglass as the major component are preferably embedded in the body in the longitudinal direction thereof at substantially diametrically opposed positions over the height and width of a transverse cross section of the body. The fiberglass wires may be prepared by impregnating a fiberglass strand with the major component resin of the body as needed. Alternatively, a reinforcement formed of a metal such as aluminum or iron is preferably embedded in the body so as to extend in the longitudinal direction thereof.

Advantages

As described above in detail, the present invention can provide a synthetic wood including a body containing a PS- or PP-based resin as the major component and a weather-resistant outer layer covering the body with enhanced adhesion between the body and the outer layer.

Figure 1:
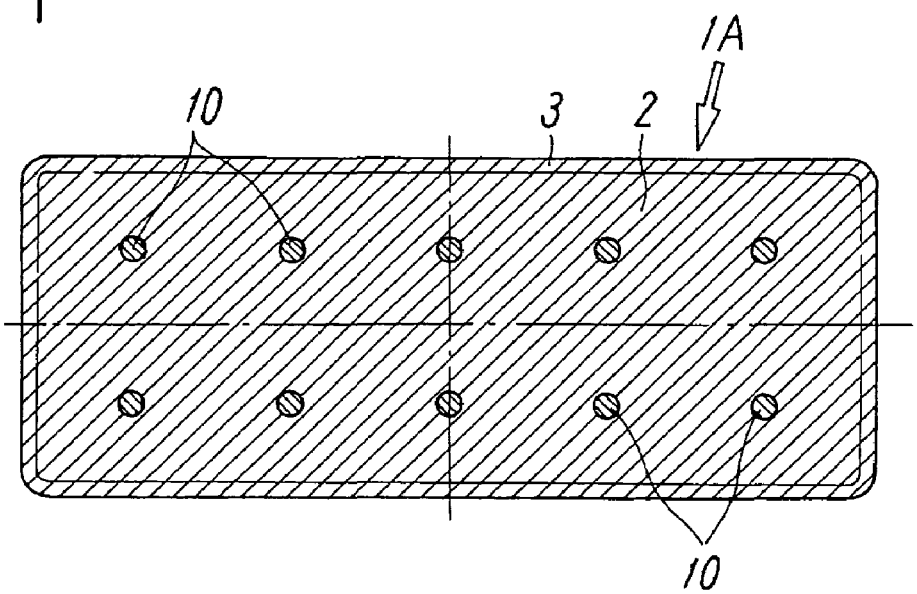
FIG. 1 is a transverse sectional view of a synthetic wood according to an embodiment of the present invention.

REFERENCE NUMERALS 1A and 1B: synthetic wood
2: body
3: outer layer
10: fiberglass wire

BEST MODE FOR CARRYING OUT THE INVENTION

A weather-resistant synthetic wood according to the present invention is a solid-core extrudate having a predetermined elongated shape in cross section. This synthetic wood basically includes a body defining a core thereof and formed of a synthetic resin foam and an outer layer covering the body and formed of a weather-resistant synthetic resin that is unfoamed or foamed at a lower expansion rate than the resin foam for the body. The body and the outer layer are integrally bonded by coextrusion. The body contains a PS- or PP-based resin as the major component. The resin used is preferably a recycled material, but may also be a virgin material or a mixture thereof. The outer layer, which contains the weather-resistant synthetic resin as the major component, contains the major component resin of the body as a minor component in such an amount that the minor component contributes to the enhancement of the adhesion between the body and the outer layer without impairing weather resistance.

First, the case where the PS-based resin is used as the major component of the body is specifically described below.

For the body containing the PS-based resin, PS is used as the major component of the body, and HI-PS is added thereto as needed. Specifically, the PP-based resin used is a mixture of 100 parts by weight of PS and 0 to 400 parts by weight of HI-PS. If the amount of HI-PS added exceeds this range, the resin exhibits significantly low foamability and thus does not deliver the necessary performance as a synthetic wood. HI-PS is usually added in any proportion less than or equal to that of PS.

A blowing agent is added to the synthetic resin foam for the body in masterbatch form in an amount of 0.5 to 6.0 parts by weight based on 100 parts by weight of the resin foam. The mixture is directly melted, kneaded, and foamed in an extruder and is extruded through a mold as a foam. The foaming magnification of the body is generally 1.2 to 3.0 times, preferably about 2 times.

The synthetic resin foam undesirably has high density and low machinability if the foaming magnification falls below 1.2 times and has low strength if the foaming magnification exceeds 3.0 times.

The density of the body, which is nearly equivalent to that of natural wood, is 0.92 at a foaming magnification of 1.2 times and is 0.36 at a foaming magnification of 3.0 times.

HI-PS is a PS containing a synthetic rubber to reduce the brittleness thereof. HI-PS may be added to PS in any proportion. As the content of HI-PS is increased, the impact strength of PS increases, but the tensile strength, stiffness, thermal resistance, and foamability thereof decrease gradually.

The weather-resistant resin used as the major component of the outer layer is AAS and/or AES. The outer layer further contains the major component of the body, namely PS, HI-PS, or a mixture thereof, as a minor component. The addition of the minor component to the outer layer significantly increases the adhesion between the body and the outer layer in comparison with an outer layer that does not contain the minor component.

The content of the minor component in the outer layer is preferably 5 to 80 parts by weight, more preferably 25 to 40 parts by weight, based on 100 parts by weight of the major component. The outer layer cannot achieve the required adhesion if the content of the minor component falls below 5 parts by weight and exhibits low weather resistance if the content of the minor component exceeds 80 parts by weight.

Woodiness with pleasant appearance and texture can be imparted to the synthetic wood by adding a small amount of blowing agent to the outer layer to foam the outer layer at a foaming magnification of about 1.1 to 1.2 times and by adding, for example, wood flour and a wood color pigment.

The amount of wood flour added is 5 to 60 parts by weight, preferably 15 to 30 parts by weight, based on 100 parts by weight of the major component. The outer layer shows no change in appearance and texture if the amount of wood flour added falls below 5 parts by weight and undesirably has low mechanical strength if the amount of wood flour added exceeds 60 parts by weight.

The amount of blowing agent added is 0 to 3.0 parts by weight based on 100 parts by weight of the major component in masterbatch form. The amount of pigment added is 0.5 to 10.0 parts by weight based on 100 parts by weight of the major component.

To present woodiness while ensuring the required mechanical strength, the outer layer preferably has a foaming magnification of about 1.1 to 1.2 times, contains wood flour in an amount of 15 to 30 parts by weight, and contains a pigment of a wood color. The synthetic wood becomes more similar in appearance and texture to natural wood with increasing amount of wood flour added, although such a synthetic wood is undesirable as a building material because of the decreased weather resistance and surface hardness. Hence, the above combination of the foaming magnification, the amount of wood flour added, and the use of a wood color pigment provides the best balance in view of increasing mechanical strength and woodiness as a synthetic wood.

The outer layer has a thickness of 0.05 to 0.7 mm, preferably 0.5 mm. For thicknesses below 0.05 mm, the outer layer lacks weather resistance and surface hardness. For thicknesses above 0.7 mm, the weather resistance levels off, and the outer layer undesirably has quality that is redundantly high with substantially no additional increase in weather resistance.

The outer layer containing the minor component may be foamed at a foaming magnification of 1 to 2 times to have a density of 1.16 to 0.62.

The body may further contain at least one of ABS, AAS, and AES as a minor component in an amount of 5 to 50 parts by weight, more preferably 10 to 25 parts by weight, based on 100 parts by weight of the major component. The addition of the minor component produces a synergistic effect of further enhancing the adhesion between the body and the outer layer.

If the content of the minor component falls below 5 parts by weight, the minor component negligibly enhances the adhesion in comparison with the case where the minor component is not added. If the content of the minor component exceeds 50 parts by weight, the minor component degrades foamability.

A mixture of ABS and AES may be added as the minor component in an amount of 10 to 25 parts by weight based on 100 parts by weight of the major component.

Wood flour may also be added to the body in an amount of 5 to 60 parts by weight based on 100 parts by weight of the major component. In addition, the body may be colored according to its intended purpose by adding an appropriate amount of pigment within the range of 0.1 to 5.0 parts by weight based on 100 parts by weight of the major component.

In the manufacturing of the synthetic wood described above, the material compositions for the body and the outer layer, prepared in advance, are supplied to two respective extruders in which the compositions are melted and kneaded before being fed to a mold. A melted solid-core foam having the shape of, for example, a rectangular column is extruded from a mold outlet as the body. At the same time, the outer layer is extruded onto the body in a melted plastic state. The two melts are continuously formed into an elongated synthetic wood through immediate bonding and cooling.

Although the synthetic wood according to this embodiment is produced as described above, reinforcements formed of a metal such as aluminum or iron may be embedded in the body so as to extend in the longitudinal direction thereof. The metal reinforcements may be embedded at the same time as the extrusion of the body. The metal reinforcements, when embedded over the length of the synthetic wood, can advantageously increase the mechanical strength of the synthetic wood and decrease the linear expansion coefficient thereof to broaden the range of applications.

The reinforcements used may also be fiberglass wires rather than metal reinforcements.

FIG. 1 is a transverse sectional view of a substantially rectangular synthetic wood 1A having many fiberglass wires 10 embedded therein. This synthetic wood 1A includes a body 2 formed of a solid-core foam and an outer layer 3 bonded to the periphery of the body 2. The fiberglass wires 10 are embedded in the body 2 in the longitudinal direction thereof at positions diametrically opposed with respect to center lines over the height and width of a transverse cross section of the body 2.

The synthetic wood 1A, which is symmetrical with respect to the center lines, can advantageously have a uniform stress balance because the fiberglass wires 10 are embedded at the diametrically opposed positions.

The fiberglass wires 10 are prepared by impregnating a strand of glass fibers with PS to integrate the fibers. The fiberglass wires 10 are embedded in the body 2 at the same time as the formation of the synthetic wood 1A. When the body 2 is extruded from a mold, the fiberglass wires 10 are fed from the backside of the mold in the direction in which the body 2 is extruded. The PS contained in the fiberglass wires 10 is softened and fused with the body 2, which is a PS foam, immediately after the fiberglass wires 10 are fed to the mold. The fiberglass wires 10 can be fused with the body 2 in a softened state because the synthetic resin used for impregnation of the fiberglass wires 10 is the same as a synthetic resin component of the body 2. The fiberglass wires 10 can thus be embedded without using any adhesive.

Figure 2:
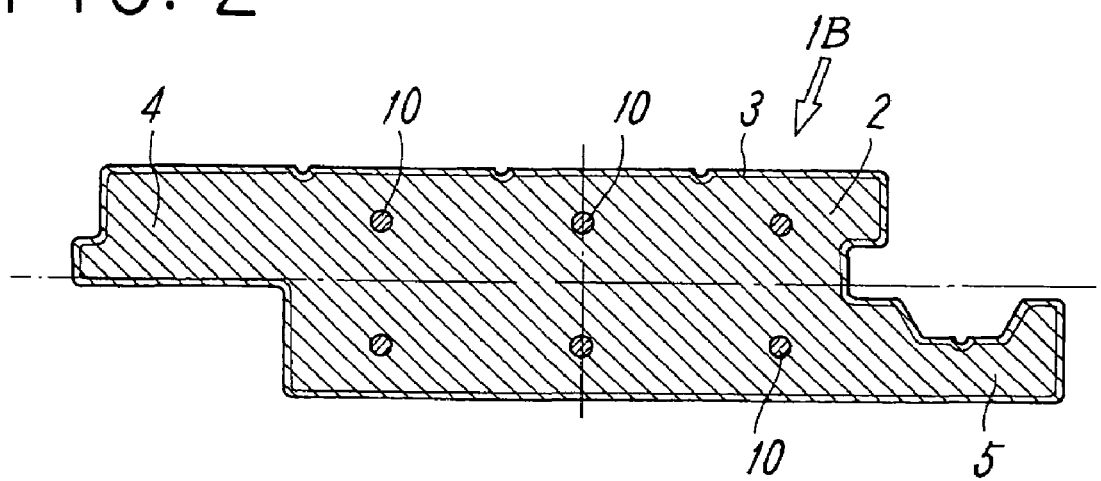
FIG. 2 is a transverse sectional view of a synthetic wood according to another embodiment of the present invention.

FIG. 2 is a transverse sectional view of a synthetic wood 1B having many fiberglass wires 10 embedded therein. This synthetic wood 1B has an irregular cross section.

For example, when the synthetic wood 1B is used for decking, boards of the synthetic wood 1B are coupled in the lateral direction. The synthetic wood 1B has a first coupling portion 4 and a second coupling portion 5. Boards of the synthetic wood 1B are coupled with the first coupling portion 4 of one board engaging with the second coupling portion 5 of another board. Decking is constructed by repeating the engagement of the required number of boards.

The fiberglass wires 10 are embedded in the main portion of the body 2, rather than the two coupling portions 4 and 5, in the longitudinal direction of the body 2 at positions diametrically opposed with respect to center lines over the height and width of a cross section of the body 2.

The synthetic wood 1B, which has the two coupling portion 4 and 5, is asymmetrical with respect to the center lines. The two coupling portions 4 and 5 negligibly affect the extension and contraction of the synthetic wood 1B because the cross-sectional area of the main portion, rather than the coupling portions 4 and 5, accounts for about 70% of the total cross-sectional area. Accordingly, the two coupling portions 4 and 5 cause no problems for practical use if the fiberglass wires 10 are embedded in the main portion at positions diametrically opposed with respect to the center lines.

The synthetic resin used for impregnation of the fiberglass wires 10 is not limited to PS. The fiberglass wires 10 may be coated with an adhesive if the use of other resins causes a problem with the adhesion to the synthetic resin for the body 2.

The two synthetic woods 1A and 1B have increased mechanical strength and decreased linear expansion coefficient because the fiberglass wires 10 are embedded over the length of the synthetic woods 1A and 1B.

The synthetic woods described above have weather resistance for use outdoors, although they may of course be used indoors.

Next, the case where the PP-based resin is used as the major component of the body is specifically described below.

For the body containing the PP-based resin, PP is used as the major component of the body, and an adhesion promoter is added thereto as a minor component as needed.

AAS, AES, or a mixture thereof is used as the major component of the outer layer covering the body. PP, which is a component of the body, is added to the outer layer as a minor component. The body and the outer layer are formed by coextrusion.

At least one of ABS, AAS, and AES is added to the major component of the body as the adhesion promoter in an amount of 5 to 50 parts by weight based on 100 parts by weight of the major component. In addition, wood flour is added in an amount of 5 to 400 parts by weight, preferably 80 to 200 parts by weight, based on 100 parts by weight of the major component. Furthermore, the material composition is foamed by adding and mixing an appropriate amount of blowing agent.

The addition of at least one of ABS, AAS, and AES to the body as an adhesion promoter significantly enhances the adhesion to the outer layer in comparison with a body containing no adhesion promoter. This is probably because acrylic functional groups contained in ABS, AAS, and AES have good mutual solubility. That is, it seems that the functional groups have binding forces acting on each other at the interface between the body and the outer layer to enhance the adhesion therebetween.

If the amount of adhesion promoter added falls below 5 parts by weight based on 100 parts by weight of PP, the adhesion promoter does not significantly enhance the adhesion in comparison with the case where no adhesion promoter is added. If the amount of minor component added exceeds 50 parts by weight, the adhesion promoter undesirably degrades foamability.

A mixture of ABS and AES is preferably added as the adhesion promoter in an amount of 10 to 25 parts by weight based on 100 parts by weight of PP.

The wood flour is added to the material composition for the body to, for example, increase the stiffness of PP and decrease the linear expansion coefficient and weight thereof. If the amount of wood flour added falls below 5 parts by weight, the addition of the wood flour does not produce a sufficient effect. If the amount of wood flour added exceeds 400 parts by weight, the body exhibits significantly low foamability and thus does not deliver the necessary performance as a synthetic wood, and also undesirably poses the risk of cracking in nailing.

The blowing agent is added to the composition for the body in masterbatch form in an amount of 0.5 to 6.0 parts by weight based on 100 parts by weight of PP. The composition is directly melted, kneaded, and foamed in an extruder and is extruded through a mold as a solid-core foam for use as the body. The foaming magnification of the body is generally 1.2 to 3.0 times, preferably about 2 times.

The body undesirably has high density and low machinability if the foaming magnification falls below 1.2 times and has low strength if the foaming magnification exceeds 3.0 times.

If the amount of wood flour added to the body is 120 parts by weight, the density of the body is nearly equivalent to that of natural wood, namely, about 0.99 at a foaming magnification of 1.2 times and about 0.40 at a foaming magnification of 3.0 times.

The body may be colored by adding an appropriate amount of pigment within the range of 0.1 to 5.0 parts by weight based on 100 parts by weight of PP.

The outer layer contains AAS, AES, or a mixture thereof as the major component and also contains the major component of the body, namely PP, as a minor component. The addition of the minor component to the outer layer produces a synergistic effect of further enhancing the adhesion between the body and the outer layer in comparison with the case where only the body contains an adhesion enhancer.

The content of the minor component in the outer layer is 3 to 10 parts by weight, preferably 5 to 7 parts by weight, based on 100 parts by weight of the major component. The outer layer cannot produce a significant effect if the content of the minor component falls below 3 parts by weight and undesirably exhibits low weather resistance if the content of the minor component exceeds 10 parts by weight.

Woodiness with pleasant appearance and texture can be imparted to the synthetic wood by adding a small amount of blowing agent to the outer layer to foam the outer layer at a foaming magnification of about 1.1 to 1.2 times and by adding, for example, wood flour and a wood color pigment.

The amount of wood flour added is 5 to 60 parts by weight, preferably 5 to 30 parts by weight, based on 100 parts by weight of the major component. The outer layer shows little change in appearance and texture if the amount of wood flour added falls below 5 parts by weight and undesirably has low mechanical strength if the amount of wood flour added exceeds 60 parts by weight.

The amount of blowing agent added is 0 to 3.0 parts by weight based on 100 parts by weight of the major component in masterbatch form. The amount of pigment added is 0.5 to 10.0 parts by weight based on 100 parts by weight of the major component.

To present woodiness while ensuring the required mechanical strength, the outer layer preferably has a foaming magnification of about 1.1 to 1.2 times, contains wood flour in an amount of 5 to 30 parts by weight, and contains a pigment of a wood color. The synthetic wood becomes more similar in appearance and texture to natural wood with increasing amount of wood flour added, although such a synthetic wood is undesirable as a building material because of the decreased weather resistance and surface hardness. Hence, the above combination of the foaming magnification, the amount of wood flour added, and the use of a wood color pigment provides the best balance in terms of mechanical strength and woodiness as a synthetic wood.

The outer layer has a thickness of about 0.05 to 0.7 mm, preferably 0.5 mm. For thicknesses below 0.05 mm, the outer layer lacks weather resistance and surface hardness. For thicknesses above 0.7 mm, the weather resistance levels off, and the outer layer undesirably has quality that is redundantly high with substantially no additional increase in weather resistance.

The outer layer containing the adhesion enhancer may be foamed at a foaming magnification of 1 to 2 times to have a density of 1.16 to 0.58.

Although the synthetic wood according to this embodiment is produced as described above, reinforcements (wires or plates) formed of a metal such as aluminum or iron or fiberglass wires may be embedded in the body, which is formed in an elongated shape, so as to extend in the longitudinal direction thereof. The reinforcements may be embedded at the same time as the extrusion of the body. The reinforcements, when embedded over the length of the synthetic wood, can advantageously increase the mechanical strength of the synthetic wood and decrease the linear expansion coefficient thereof to broaden the range of applications.

How the fiberglass wires are embedded as reinforcements is not described here because they are embedded in substantially the same manner as in the embodiment described with reference to FIGS. 1 and 2, where the PS-based resin is used for the body. In this embodiment, the fiberglass wires 10 used are preferably prepared by impregnating a strand of glass fibers with PS to integrate the fibers.

EXAMPLES

Next, examples of the present invention in which the major component of the body is a PS- or PP-based resin are described below together with comparative examples.

Example 1

The material composition of the body was as follows:
Mixture of PS and HI-PS (70:30) 100 parts by weight
ABS (minor component) 12 parts by weight
Blowing agent: ES-405 (trade name; a masterbatch manufactured by Eiwa Chemical Ind. Co., Ltd)
3 parts by weight
Pigment: PS-M (trade name; a masterbatch manufactured by Dainichiseika Color & Chemicals Mfg. Co., Ltd.) (hue: brown)
0.6 part by weight
The material composition of the outer layer was as follows:
AAS 100 parts by weight
Mixture of PS and HI-PS (75:25) (minor component) 26 parts by weight
Pigment: AH9002 (trade name; a masterbatch manufactured by Zeon Kasei Co., Ltd.) (hue: wood color)
4 parts by weight The above materials for the body and the outer layer were supplied to extruders and were subjected to coextrusion to produce a synthetic wood.

Comparative Example 1

A synthetic wood was produced using the same compositions in the same manner except that the minor components were not added.

A sensory test was performed on the synthetic woods produced in Example 1 and Comparative Example 1 by peeling the outer layers from the bodies by hand to compare the adhesion therebetween.

The results show that the outer layer of the synthetic wood produced in Example 1 adhered strongly to the body and was difficult to peel by hand while the outer layer of the synthetic wood produced in Comparative Example 1 adhered weakly to the body and could easily be peeled by hand.

Example 2

The material composition of the body was as follows:
PP 100 parts by weight
Wood flour 150 parts by weight
AAS (minor component) 18 parts by weight
Blowing agent 2.5 parts by weight
Pigment (hue: brown) 2.0 parts by weight
The material composition of the outer layer was as follows:
AAS 100 parts by weight
PP (minor component) 6 parts by weight
Pigment (hue: wood color) 2.0 parts by weight The above materials for the body and the outer layer were supplied to extruders and were subjected to coextrusion to produce a synthetic wood. The foaming magnification of the body was about 1.8 times. The outer layer covering the body had a thickness of about 0.5 mm.

Comparative Example 2

A synthetic wood was produced using the same compositions in the same manner except that the minor components were not added.

The synthetic woods produced in Example 2 and Comparative Example 2 were tested by peeling the outer layers from the bodies by hand to compare the adhesion therebetween.

The results show that the outer layer of the synthetic wood produced in Example 2 adhered strongly to the body and was difficult to peel by hand while the outer layer of the synthetic wood produced in Comparative Example 2 adhered weakly to the body and was easily peeled by hand.

The invention claimed is:

1. A weather-resistant synthetic wood comprising a foamed core body material and a weather-resistant outer layer material covering a surface of and integrally bonded by coextrusion molding to said foamed core body material, wherein said weather-resistant outer layer material is unfoamed or foamed at an expansion rate lower than that of said foamed core body material, wherein said foamed core body material is a mixture comprising: 100 wt. % of a primary component comprising either a polystyrene resin and an optional high-impact polystyrene resin, or a polypropylene resin; and 5-50 wt. % of a secondary component comprising one or more of an acrylonitrile-butadiene-styrene copolymer, an acrylonitrile-acrylic-styrene copolymer, and an acrylonitrile-ethylene-propylene-styrene copolymer, based on 100 wt. % of said primary component of said foamed core body material, wherein said weather-resistant outer layer material is a mixture comprising: 100 wt. % of a primary component comprising one or both of an acrylonitrile-acrylic-styrene copolymer, and an acrylonitrile-ethylene-propylene-styrene copolymer; and 5-80 wt. % of a secondary component comprising one or more of a polystyrene resin, a high-impact polystyrene resin, and a polypropylene resin, based on 100 wt. % of said primary component of said weather-resistant outer layer material, and wherein said primary component of said foamed core body material comprises a mixture of a polystyrene resin and a high-impact polystyrene resin, and said secondary component of said weather-resistant outer layer material comprises a mixture of a polystyrene resin and a high-impact polystyrene resin, or wherein said primary component of said foamed core body material comprises a polypropylene resin, and said secondary component of said weather-resistant outer layer material comprises a polypropylene resin.

2. The weather-resistant synthetic wood according to claim 1, wherein said primary component of said foamed core body material comprises a mixture of a polystyrene resin and a high-impact polystyrene resin, and said secondary component of said weather-resistant outer layer material comprises a mixture of a polystyrene resin and a high-impact polystyrene resin.

3. The weather-resistant synthetic wood according to claim 2, wherein a mixing ratio of said polystyrene resin to said high-impact polystyrene resin in said primary component of said foamed core body material is 70:30, and a mixing ratio of said polystyrene resin to said high-impact polystyrene resin in said secondary component of said weather-resistant outer layer material is 75:25.

4. The weather-resistant synthetic wood according to claim 2, wherein one or both of said polystyrene resin and said high-impact polystyrene resin of said primary component of said foamed core body material and/or said secondary component of said weather-resistant outer layer material is selected from a recycled material or a mixture of a recycled material and a virgin material.

5. The weather-resistant synthetic wood according to claim 1, wherein said primary component of said foamed core body material comprises a polypropylene resin, and said secondary component of said weather-resistant outer layer material comprises a polypropylene resin.

6. The weather-resistant synthetic wood according to claim 1, wherein said weather-resistant outer layer material has a foaming magnification of 1.0 to 2.0 times.

7. The weather-resistant synthetic wood according to claim 1, wherein said weather-resistant outer layer material has a foaming magnification of about 1.1 to about 1.2 times.

8. The weather-resistant synthetic wood according to claim 1, wherein said weather-resistant outer layer material further comprises 5-60 wt. % of a wood flour, based on 100 wt. % of said primary component of said weather-resistant outer layer material.

9. The weather-resistant synthetic wood according to claim 1, wherein said weather-resistant outer layer material further comprises: 0.5-10.0 wt. % of a wood color pigment, based on 100 wt. % of said primary component of said weather-resistant outer layer material; and 0-3.0 wt. % of an optional blowing agent, based on 100 wt. % of said primary component of said weather-resistant outer layer material.

10. The weather-resistant synthetic wood according to claim 1, wherein said weather-resistant outer layer material has a thickness of 0.05 mm to 0.7 mm.

11. The weather-resistant synthetic wood according to claim 1, wherein said weather-resistant outer layer material has a density of 1.16 to 0.62.

12. The weather-resistant synthetic wood according to claim 1, wherein said foamed core body material has a foaming magnification of 1.2 to 3.0 times.

13. The weather-resistant synthetic wood according to claim 1, wherein said foamed core body material further comprises 5-400 wt. % of a wood flour, based on 100 wt. % of said primary component of said foamed core body material.

14. The weather-resistant synthetic wood according to claim 1, wherein said foamed core body material further comprises 80-200 wt. % of a wood flour, based on 100 wt. % of said primary component of said foamed core body material.

15. The weather-resistant synthetic wood according to claim 1, wherein said foamed core body material further comprises 5-60 wt. % of a wood flour, based on 100 wt. % of said primary component of said foamed core body material.

16. The weather-resistant synthetic wood according to claim 1, wherein said foamed core body material further comprises 0.1-5.0 wt. % of a wood color pigment, based on 100 wt. % of said primary component of said foamed core body material.

17. The weather-resistant synthetic wood according to claim 1, wherein said foamed core body material further comprises 0.5-6.0 wt. % of a blowing agent, based on 100 wt. % of said primary component of said foamed core body material.

18. The weather-resistant synthetic wood according to claim 1, wherein said foamed core body material has a density of 0.99 to 0.36.

19. The weather-resistant synthetic wood according to claim 1, wherein said foamed core body material further comprises a reinforcement material embedded therein in a longitudinal direction thereof.

20. The weather-resistant synthetic wood according to claim 19, wherein said reinforcement material is longitudinally embedded in said foamed core body at substantially diametrically opposed positions over a height and a width of a transverse cross section thereof.

21. The weather-resistant synthetic wood according to claim 19, wherein said reinforcement material is fiberglass wires.

22. The weather-resistant synthetic wood according to claim 21, wherein said fiberglass wires are impregnated and integrated with a polystyrene resin.

23. The weather-resistant synthetic wood according to claim 19, wherein said reinforcement material is a metal.

24. The weather-resistant synthetic wood according to claim 23, wherein said metal is aluminum.

25. The weather-resistant synthetic wood according to claim 23, wherein said metal is iron.

26. The weather-resistant synthetic wood according to claim 1, wherein said polypropylene resin of said primary component of said foamed core body material and/or said secondary component of said weather-resistant outer layer material is selected from a recycled material or a mixture of a recycled material and a virgin material.

* * * * *